US011757652B2

United States Patent
Alwen et al.

(10) Patent No.: US 11,757,652 B2
(45) Date of Patent: Sep. 12, 2023

(54) DECENTRALIZED SYSTEM FOR SECURELY RESOLVING DOMAIN NAMES

(71) Applicant: Wickr Inc., Pleasanton, CA (US)

(72) Inventors: Joël Alwen, Vienna (AT); Thomas Michael Leavy, River Edge, NJ (US); Christopher A. Howell, Freehold, NJ (US)

(73) Assignee: WICKR INC., Pleasanton, CA (US)

( * ) Notice: Subject to any disclaimer, the term of this patent is extended or adjusted under 35 U.S.C. 154(b) by 129 days.

(21) Appl. No.: 17/032,157

(22) Filed: Sep. 25, 2020

(65) Prior Publication Data

US 2022/0103370 A1    Mar. 31, 2022

(51) Int. Cl.

| H04L 29/06 | (2006.01) |
|---|---|
| H04L 9/32 | (2006.01) |
| H04L 9/30 | (2006.01) |
| H04L 61/10 | (2022.01) |
| H04L 61/3015 | (2022.01) |
| H04L 9/08 | (2006.01) |

(52) U.S. Cl.
CPC ............ *H04L 9/3247* (2013.01); *H04L 9/088* (2013.01); *H04L 9/30* (2013.01); *H04L 61/10* (2013.01); *H04L 61/3025* (2013.01)

(58) Field of Classification Search
CPC ......... H04L 9/3247; H04L 9/088; H04L 9/30; H04L 61/10; H04L 61/3025; H04L 61/45
See application file for complete search history.

(56) References Cited

U.S. PATENT DOCUMENTS

| 9,866,591 B1 | 1/2018 | Statica et al. | |
|---|---|---|---|
| 2017/0272316 A1* | 9/2017 | Johnson | H04L 61/301 |
| 2019/0081796 A1* | 3/2019 | Chow | G06Q 20/34 |
| 2019/0349426 A1* | 11/2019 | Smith | H04L 63/123 |

FOREIGN PATENT DOCUMENTS

| CN | 110061838 A | * | 7/2019 | | G06F 16/137 |
|---|---|---|---|---|---|
| WO | WO-2018191882 A1 | * | 10/2018 | | H04L 61/103 |
| WO | WO-2020031086 A1 | * | 2/2020 | | G06F 16/182 |

* cited by examiner

*Primary Examiner* — Joseph P Hirl
*Assistant Examiner* — Leynna Truvan
(74) *Attorney, Agent, or Firm* — Davis Wright Tremaine LLP

(57) ABSTRACT

A decentralized system for securely registering, updating, and/or resolving domain names in a distributed ledger is disclosed. The distributed ledger may comprise a smart contract that includes a look-up table that maps network names to network addresses and/or one or more keys. The smart contract may verify whether any updates and/or changes made to an entry in the look-up table are cryptographically authorized. Additionally, the smart contract may enforce any additional policies implemented by a domain administrator for authenticating changes and/or updates to a domain name entry. The unique combination of storing domain information in a decentralized ledger and validating changes and/or updates to the domain information provides a decentralized root of trust that allows for secure queries of network names (e.g., domain name) for secure cross-entity communications.

19 Claims, 7 Drawing Sheets

DECENTRALIZED SYSTEM FOR SECURELY RESOLVING DOMAIN NAMES

BACKGROUND

Entities, such as corporations, may make use of communication tools, such as secure messaging applications. These communication tools may allow a first user, associated with a first entity (e.g., corporation), to communicate with a second user, associated with a second entity different from the first entity. On a per entity-level, these communication tools may be referred to as federated networks. Accordingly, the first entity may comprise a first federated network which allows users to communicate using a secure messaging application. Similarly, the second entity may comprise a second federated network. Based on various permissions that may be assigned to each federated network, the users from the first federated network may communicate with users from the second federated network, and vice versa.

While these federated networks allow for cross-entity communication, they also require a secure mechanism for mapping network names (e.g., domain names associated with the federated network) to network addresses (e.g., IP addresses). That is, when the first user, of the first federated network, wishes to communicate with the second user, of the second federated network, the first federated network may have to resolve the network name (e.g., domain name) of the second federated network to a network address in order to send (e.g., route) communications from the first federated network to the second federated network. However, existing domain name system (DNS) solutions suffer from a variety of shortcomings, the most notable being a lack of adequate cryptography to verify ownership of the network addresses (e.g., IP addresses) at the time the network name (e.g., domain name) is registered and/or updated. Secure Sockets Layer (SSL)/Transport Layer Security (TLS) may provide a solution by using certificates that contain digital signatures which may bind the network name (e.g., domain name) to the network name's owner's key material. Yet, this also presents a single point of failure. That is, if the certificate authority that issued the certificate is compromised, the networks (e.g., federated networks) that rely on that certificate authority may be hijacked by malicious users. Accordingly, the communications between federated networks may be subsequently intercepted by malicious actors. Therefore, trusting individual certificate authorities is an inadequate solution for entities that are seeking secure cross-entity communications.

Based on the foregoing, there is a need for a decentralized root of trust that allows for trusted network name (e.g., domain name) look-ups that allow for the secure exchange of cross-entity communications.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes a decentralized system for securely registering, updating, and/or resolving domain names of federated networks. The decentralized system described herein may use a smart contract in a decentralized ledger (e.g., blockchain) as a root of trust. The smart contract may comprise a look-up table that maps network names (e.g., domain names) to network addresses (e.g., IP addresses) and/or one or more keys (e.g., public keys). The look-up table may be publicly accessible. Despite being publicly accessible, the look-up table may be secured by the smart contract. For example, the smart contract may verify whether any updates and/or changes made to an entry in the look-up table is cryptographically authorized (e.g., digitally signed). In this regard, an entry in the look-up table domain (e.g., federated network) may be updated and/or changed in response to one or more authentication techniques. For example, changes and/or updates to the domain may be made based on authentication of 1) the domain keys, 2) the domain keys or a root key, or 3) the domain keys and the root key. The authentication technique for a respective domain may be stored in the domain's entry (e.g., record) in the look-up table and enforced by the smart contract. The unique combination of storing the domain information in a distributed ledger and validating changes and/or updates to the domain information using the techniques described above provides a decentralized root of trust that allows for secure queries of network names (e.g., domain name) for secure cross-entity communications. Additionally, the distributed ledger provides an additional benefit of being resistant to certain types of attacks, especially Denial of Service (DoS) attacks.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways.

In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or computer-readable media for a decentralized system for securely managing domain information in a distributed ledger. The distributed ledger may comprise a smart contract. The smart contract may define how to register, change, and/or de-register a domain name. Additionally, the smart contract may comprise a look-up table that maps network names to network addresses and/or one or more keys. In this regard, federated networks associated with domains and/or entities may query the look-up table to resolve a network address of a message and/or communication addressed to a recipient in a different federated network. The smart contract may also verify whether any updates and/or changes made to an entry in the look-up table are cryptographically authorized. Accordingly, the systems, devices, and methods described herein may provide a distributed domain name service that mitigates against malware and/or attacks (e.g., DoS). Furthermore, the authentication techniques described below may provide varying degrees of security that ensure the integrity and/or security of the information contained in the distributed ledger. Thus, the distributed domain name service described herein improves upon the security and/or mitigates against known attacks against existing domain name service solutions.

Figure 1:
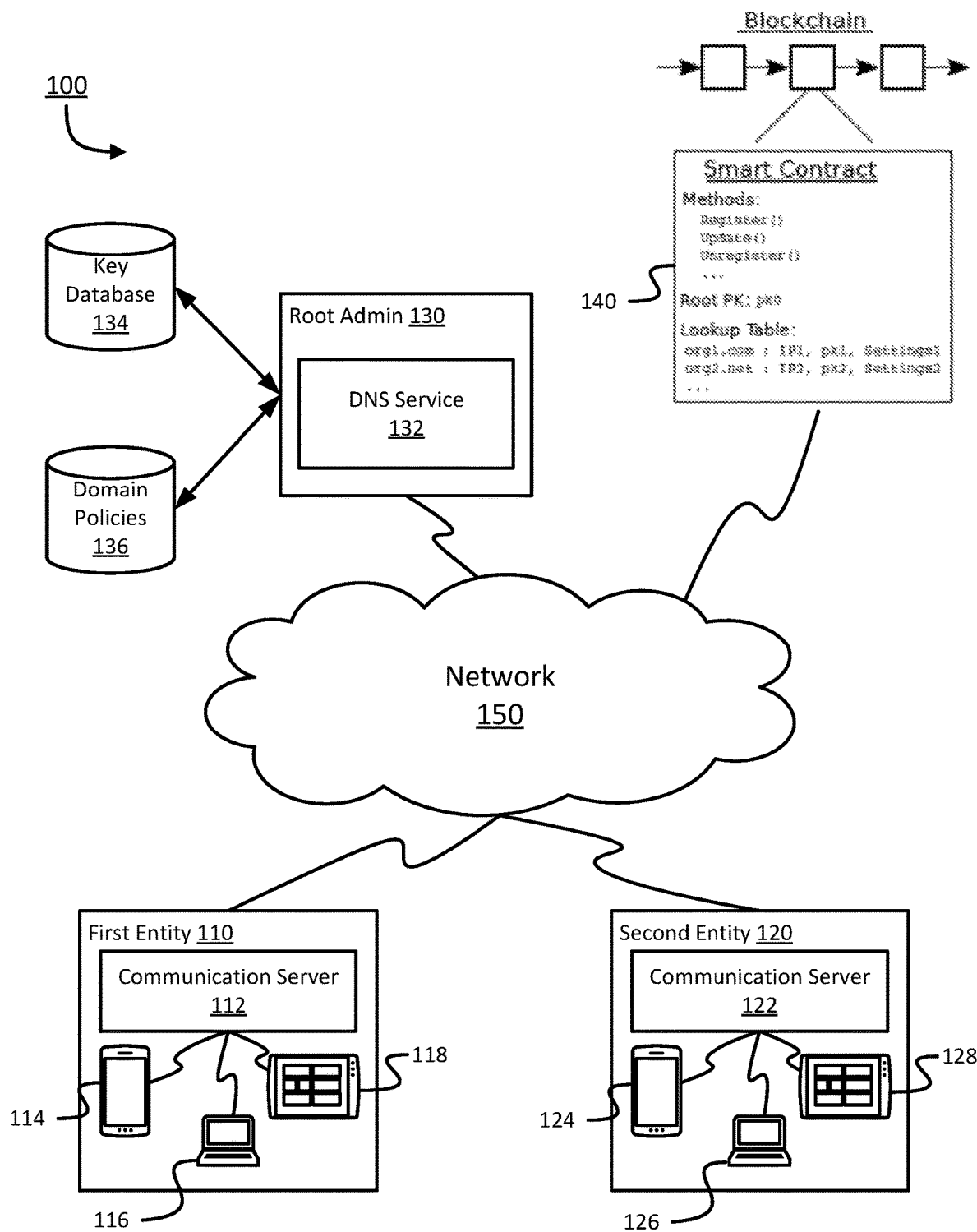
FIG. 1 shows an example of a system in which one or more features described herein may be implemented.

FIG. 1 illustrates an example of a system 100 in which encrypted messages and/or communications may be exchanged. FIG. 1 shows a first entity 110, a second entity 120, a root administrative server 130, and a smart contract 140 all interconnected via network 150.

First entity 110 may be any legal entity (e.g., corporation, natural person, etc.) that has created a federated network. As noted above, a federated network may be a communication network that provides users the ability to send and receive encrypted messages and/or communications. As used herein, "messages" include text messages, chat room messages, control messages, commands, e-mails, documents, audiovisual files, Short Message Service messages (SMSes), Multimedia Messages Service messages (MMSes), and the like. Further, "communications" may include streaming data, such as video data and audio data transmitted as part of a voice or video call or a video conference, and application data transmitted as part of application sharing or screen sharing function. In some examples, the content of the messages and/or communications may pertain to sensitive information, such as electronic transactions, credit card information, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. Users may install a secure collaboration application on one or more of their devices. The secure collaboration application may provide a user interface for users to send and/or receive messages and communications. Secure messages and/or communications may be exchanged using serialized packets. The serialized packets allow information, such as encryption information, hardware binding information, message security controls, and decryption information—for multiple receivers (as applicable)—to securely travel with the message and/or communication. The serialized packets also provide cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices may be able to decrypt the messages and/or communications.

First entity 110 may comprise a first communication server 112. Additionally, first entity 110 may comprise a first client device 114, a second client device 116, and/or a third client device 118. First communication server 112 may be a stand-alone server, a corporate server, a virtual machine, a server located in a server farm or cloud-computing environment, or any combination thereof. In some examples, the first communication server 112 may be a cloud service provider running one or more virtual machines configured to provide a secure communication platform to one or more entities. The secure communication platform may be provided in the context of Software as a Service (SaaS). In other examples, the secure communication platform may be provided to companies as an on-premise solution that is installed and maintained by the entity's IT staff on servers or cloud computing devices operated by the company. As noted above, the intended recipient may be the only party capable of decrypting the encrypted messages and/or communications. That is, first communication server 112 may be unable to decrypt messages and/or communications. As will be discussed in greater detail below, participants can maintain a forward and backward secret secure communication channel using the techniques described herein, whether communicating synchronously (e.g., where all participants are online) or asynchronously (e.g., where at least one participant is offline).

Users of client devices, such as first client device 114, second client device 116, and/or third client device 118, may communicate securely with one another using the techniques described herein. For example, first client device 114, second client device 116, and/or third client device 118 may make use of a secure communication platform, and the techniques described herein via, a secure collaboration application installed on each of first client device 114, second client device 116, and/or third client device 118, respectively. As shown in FIG. 1, client devices may be mobile devices, such as laptops, smart phones, or tablets, or computing devices, such as desktop computers or servers. As noted above, the secure collaboration application described herein allows cross-platform collaboration, thereby allowing users of various devices to communicate seamlessly. Further, each user may have different instances of the collaboration application installed across multiple devices. That is, the user of first client device 114 may be able to receive messages and/or communications on both first client device 114, as well as on any other devices that the user may have that includes a copy of the secure collaboration application, such as a laptop or desktop computer. In some examples, first client device 114, second client device 116, and/or third client device 118 may be the users' personal devices (i.e. a bring your own device (BYOD) scenario). Alternatively, first client device 114, second client device 116, and/or third client device 118 may include other types of devices, such as sensors, game consoles, camera/video recorders, video players (e.g., incorporating DVD, Blu-ray, Red Laser, Optical, and/or streaming technologies), smart TVs, and other network-connected appliances, as applicable.

Second entity 120 may be any legal entity (e.g., corporation, natural person, etc.) that has created a federated network Like first entity 110, the second entity 120 may comprise a second communication server 122, fourth client device 124, fifth client device 126, and sixth client device 128.

Second communication server 122 may also be a stand-alone server, a corporate server, a virtual machine, a server located in a server farm or cloud-computing environment, or any combination thereof. The first communication server 122 may be a cloud service provider running one or more virtual machines configured to provide a secure communication platform to one or more entities, including second entity 120. As noted above, the secure communication platform may be a SaaS offering. Additionally or alternatively, the secure communication platform may be provided to second entity 120 as an on-premise solution that is installed and maintained by the second entity 120's devices (e.g., servers, cloud computing devices, etc.).

Users may use fourth client device 124, fifth client device 126, and/or sixth client device 128 to communicate securely with one another using the techniques described herein. As described above, fourth client device 124, fifth client device 126, and/or sixth client device 128 may use secure communication platform, and the techniques described herein via a secure collaboration application installed thereon. Fourth client device 124, fifth client device 126, and/or sixth client device 128 may be mobile devices, such as laptops, smart phones, or tablets, or computing devices, such as desktop computers or servers.

The root administrative server 130 may be server associated with a developer of the secure communication platform and/or the secure collaboration application. Additionally or alternatively, the root administrative server 130 may be a trusted third party. The root administrative server 130 may be any suitable computing device, such as a stand-alone server, a corporate server, a virtual machine, a server located in a server farm or cloud-computing environment, or any combination thereof. In some instances, root administrative server 130 may provide back-end services for first communication server 112, second communication server 122, first client device 114, second client device 116, third client device 118, fourth client device 124, fifth client device 126, sixth client device 128, or any combination thereof. Additionally or alternatively, root administrative server 130 may be configured to provide a domain name service (DNS) 132 for one or more plurality of federated networks. As will be discussed in greater detail below, DNS 132 may generate a smart contract (e.g., smart contract 140) that defines rules and/or terms for a domain look-up table, receive requests for resolving domain names, manage the look-up table stored in a distributed ledger, and the like. Root administrative server 130 may also comprise a key database 134 and/or domain policy database 136 containing domain policies.

Key database 134 may be configured to store one or more root keys associated with root administrative server 130 and/or smart contract 140. The root keys may comprise an asymmetric key pair, in which a first key (e.g., private key) may be used to generate a signature and a second key (e.g., public key), corresponding to the first key, may be used to verify the signature. Additionally or alternatively, key database 134 may comprise domain keys and/or domain root keys for each of the federated networks. According to some embodiments, key database 134 may include, but is not limited to, relational databases, hierarchical databases, distributed databases, in-memory databases, flat file databases, XML databases, NoSQL databases, graph databases, and/or a combination thereof.

Domain policy database 136 may be configured to store a plurality of policies. Each policy may be associated with one or more domains and/or federated networks. A policy may define how an administrator is authenticated and/or how a domain name entry stored in a look-up table may be updated. In this regard, the policy may be defined at the time the federated network is created. Additionally or alternatively, the policy may define the authentication requirements to authenticate an administrator and/or update a domain name entry. For example, the policy may define that the domain name entry may be updated upon verification of a signature generated using a domain key associated with the domain name (e.g., federated network). This may allow an administrator of the domain name (e.g., federated network) to manage their domain name entry directly. Alternatively, the policy may define that the domain name entry may be modified upon verification of a first signature generated using a domain key associated with the domain name (e.g., federated network) or a second signature using a root key associated with root administrative server 130. This scenario may allow a root administrator to recover the domain name entry, for example, if the federated network is compromised by a malicious user or the administrator of the federated network has forgotten or lost their credentials. In another example, the policy may define that the domain name entry may be modified upon verification of a first signature generated using a domain key associated with the domain name (e.g., federated network) and a second signature using a root key associated with root administrative server 130. Administrators of federated networks may select this last policy option, for example, to provide a greater degree of security and safeguard against malicious users hijacking a domain name. In still further examples, the policy may define additional authentication criteria, such as, only allowing modifications from predetermined ranges of network address, password authentication, requiring verbal confirmation, and the like.

Smart contract 140 may be a computer program or a transaction protocol that is intended to automatically execute, control, or document relevant events and/or actions according to the terms of a contract or an agreement. Smart contract 140 may define methods for registering a new federated network, creating a new domain name entry in a look-up table, updating a domain name entry in a look-up table, un-registering a federated network, and the like. Additionally, smart contract 140 may define the root public key, which may be used to verify signatures appended to commands and/or requests generated by root administrative server 130. Further, smart contract 140 may define a look-up table for domain name entries associated with a plurality of federated networks. Each entry in the look-up table may comprise a domain name, a network address (e.g., IP address), a public key associated with the domain, one or more settings for the domain (e.g., federated network), and the like. Smart contract 140 may be stored in a distributed ledger (e.g., blockchain). In operation, smart contract 140 may receive a request to resolve a network address for a domain name. That is, a first entity and/or communication server (e.g., first federated network) may query the smart contract to resolve a network address to send (e.g., transmit) an encrypted communication to a second entity (e.g., second federated network), different from the first entity. Smart contract 140 may respond to the first entity with the network address (e.g., IP address) of the second entity. In some examples, the response may comprise a public key associated with the second entity. The first entity may use the second entity's public key to establish a secure communication channel (e.g., secured via Transport Layer Security (TLS)) between the first entity and the second entity. Upon receiving the request to establish the secure communication channel, the second entity may submit a query to smart contract 140. After performing a similar authentication for the second entity, the second entity may receive the first entity's network address (e.g., IP address) and/or public key. The first entity's public key may be used to establish the secure communication channel, which in turn is used to exchange the encrypted messages and/or communications described herein.

Network 150 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

Figure 2:
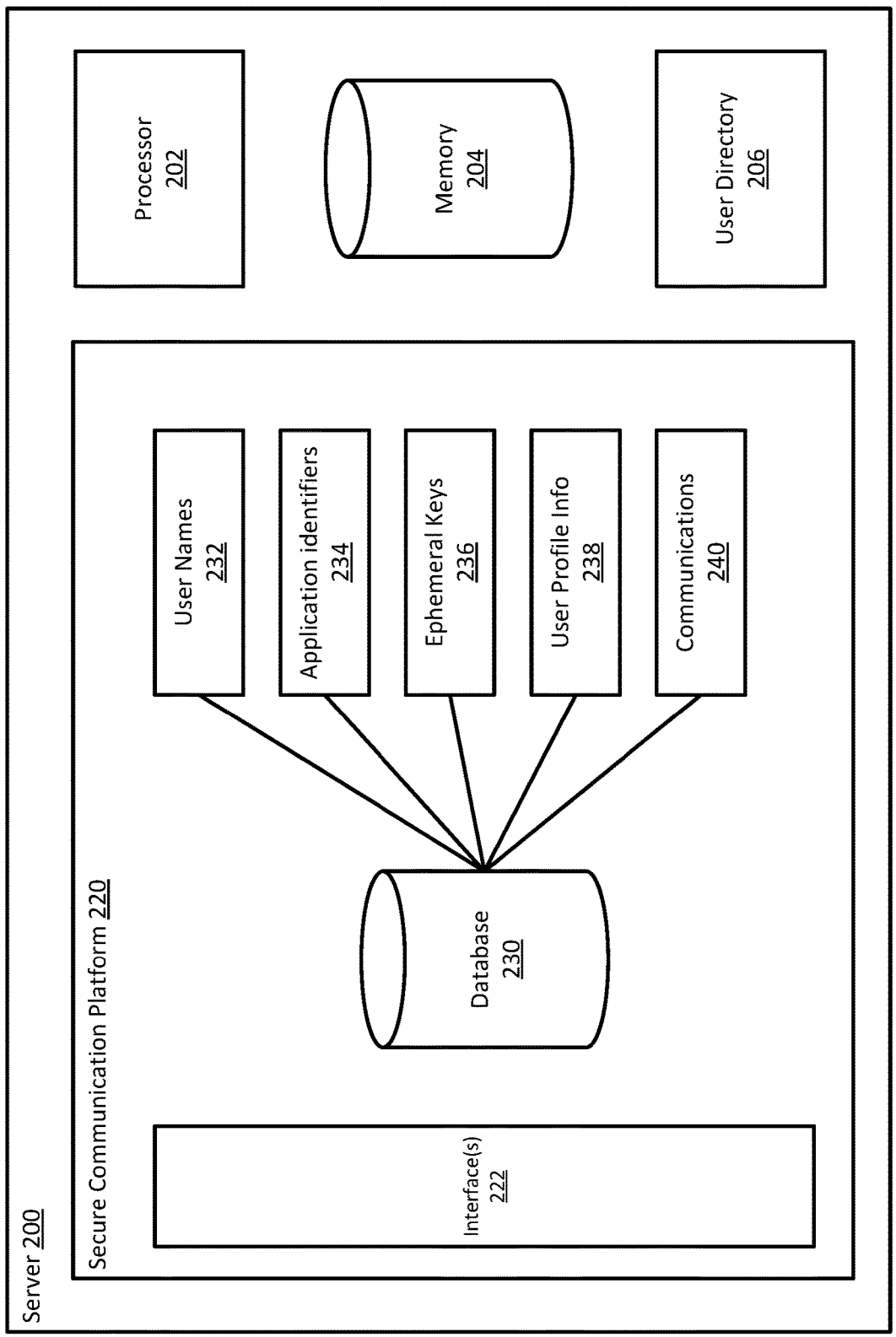
FIG. 2 shows an example a secure communication platform in accordance with one or more aspects of the disclosure.

As shown in FIG. 2, secure communication platform 220 may be implemented on server 200. Server 200 may include a processor 202, memory 204, user directory 206, and the secure communication platform 220. In this regard, server 200 may be a stand-alone server, a corporate server, or a server located in a server farm or cloud-computing environment. In some examples, server 200 may be a cloud service provider running a virtual machine configured to provide secure communication platform 220 to an enterprise as a Software as a Service (SaaS).

Processor 202 may be any conventional processor capable of interacting with memory 204, user directory 206, and secure communication platform 220. In this regard, processor 202 may include a processor, a multiprocessor, a multicore processor, or any combination thereof. Alternatively, processor 202 may be a dedicated controller, such as an Application Specific Integrated Circuit (ASIC) or Field Programmable Gate Array (FPGA).

Memory 204 stores information accessible by processor 202, including instructions and data that may be executed or otherwise used by the processor 202. According to some examples, memory 204 may store instructions and data necessary to execute secure communication platform 220. In this regard, memory 204 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 204 may include short-term or temporary storage, as well as long-term or persistent storage. According to some examples, memory 204 may include a storage area network (SAN) accessible by server 200 and/or secure communication platform 220.

User directory 206 may be any database or table capable of providing directory services. For example, user directory may include a corporate directory that include employees' first and last names, usernames, email address, phone numbers, department information, etc. Alternatively, user directory 206 may be a database or table to maintain user information for users of secure communication platform 220. In this regard, user directory 206 may be encrypted to protect the information contained therein. In some examples, user directory 206 may serve as a secure directory that includes a table of hashed usernames, a table of application identifiers, and a table of device identifiers for secure collaboration application. Accordingly, user directory 206 may be used to share information about users, systems, networks, services and applications. According to some examples, the user directory 206 may include a Lightweight Directory Access Protocol (LDAP), Active Directory, or an equivalent directory service.

Although FIG. 2 illustrates processor 202, memory 204, user directory 206, and secure communication platform 220 as being located on server 200, processor 202 and memory 204 may comprise multiple processors and memories that may or may not be stored within the same physical housing. For example, memory 204 may be a hard drive or other storage media located in a server farm of a data center, such as a storage area network (SAN). Accordingly, references to a processor, a computer, or a memory will be understood to include references to a collection of processors or computers or memories that may or may not operate in parallel. Further, the user directory 206 may be located in a separate physical housing from processor 202 and memory 204. Moreover, secure communication platform 220 may be distributed across multiple servers.

Secure communication platform 220 may be configured to facilitate the exchange of messages and communications for users of a secure collaboration application. As used herein, "messages" include text messages, chat room messages, control messages, commands, e-mails, documents, audiovisual files, Short Message Service messages (SMSes), Multimedia Messages Service messages (MMSes), and the like. Further, "communications" may include streaming data, such as video data and audio data transmitted as part of a voice or video call or a video conference, and application data transmitted as part of application sharing or screen sharing function. In some examples, the content of the messages and/or communications may pertain to sensitive information, such as electronic transactions, credit card information, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Secure communication platform 220 may provide encrypted messages and communications that easily integrate into and secure existing systems while providing compliant and secure messages and communications. In this regard, secure communication platform 220 may integrate with existing identity systems, such as user directory 206, or existing communication platforms, such as e-mail systems, messaging platforms, etc. In some examples, secure communication platform 220 may include built-in support for enterprise data retention and support systems as described in co-pending U.S. application Ser. No. 14/811,765, entitled "Enterprise Messaging Platform," the entirety of which is incorporated herein by reference.

Secure communication platform 220 may also include database 230. Database 230 may be a relational database that stores information in a variety of tables. In this regard, database 230 may include a record for each user of platform 220 to allow users to find and communicate with other users. Accordingly, database 230 may include a table of user names 232, a table of application identifiers 234, a pool of ephemeral keys 236, and a table of user profile information 238. User profile information may include a privacy mode set by the user and one or more privacy lists to control with whom the user may communicate. Additionally, database 230 may include a table of communications 240. That is, the secure communication platform may store messages for a predetermined time in table of communications 240. For example, when a message is received, the secure communication platform may store the message in the table of communications 240 and provide an alert, such as a push notification, to the receiver. Accordingly, a receiver may access the secure communication platform to obtain his or her messages stored in table of communications 240. In preferred examples, table of communications 240 may store messages for 30 days; however, this may be adjusted, as needed, based on industry standards and/or to comply with regulatory schemes.

While a database is shown in FIG. 2, other techniques can be used to store the information used by platform 220 to facilitate the exchange of encrypted messages and/or communications. For example, the table of communications 240 may be stored in a separate storage, such as memory 204 or a second server (not shown), instead of being stored within database 230. Alternatively, the information contained in the database 230 may be divided between database 230 and user directory 206. In this regard, database 230 and user directory 206 may interface to exchange information. Further, additional information can be securely stored on platform 220, whether in database 230 or another appropriate location.

Secure communication platform 220 may include one or more interfaces 222 for communicating with the first client device 114, second client device 116, third client device 118, fourth client device 124, fifth client device 126, and/or sixth client device 128. As one example, platform 220 may provide an application programming interface (API) configured to communicate with applications installed on client devices. Platform 220 may also provide other types of interfaces, such as a web interface, or stand-alone software programs for desktops and laptops, running on various Operating Systems (OSes). The web interface may allow users of client devices to exchange messages and/or communications securely (whether with one another or other users), without the need for a separately installed collaboration application. The standalone software program may allow users to exchange secure messages and communications via software that is downloaded by each user. According to some examples, platform 220 may make available a master clock time available via the one or more interfaces 222. The master clock time may be used by client applications to enforce secure time-to-live (TTL) values of messages. The TTL values can be used to enforce (e.g., on behalf of a message sender) time constraints on message access (e.g., by a receiver).

As will be described in greater detail below, processor 202 may perform a plurality of tasks on behalf of secure communication platform 220. Furthermore, whenever platform 220 is described as performing a task, either a single component or a subset of components or all components of platform 220 or server 200 may cooperate to perform the task. For example, platform 220 may designate one of the keys in a pool of ECDH public keys received from a user of a device as a "reserve" key. Another task performed by platform 220 may include facilitating the addition of new keys to a user's pool of public keys as they are used. Yet another task performed by platform 220 may include dynamically adjusting the size of a user's pool of public keys as needed.

Figure 3:
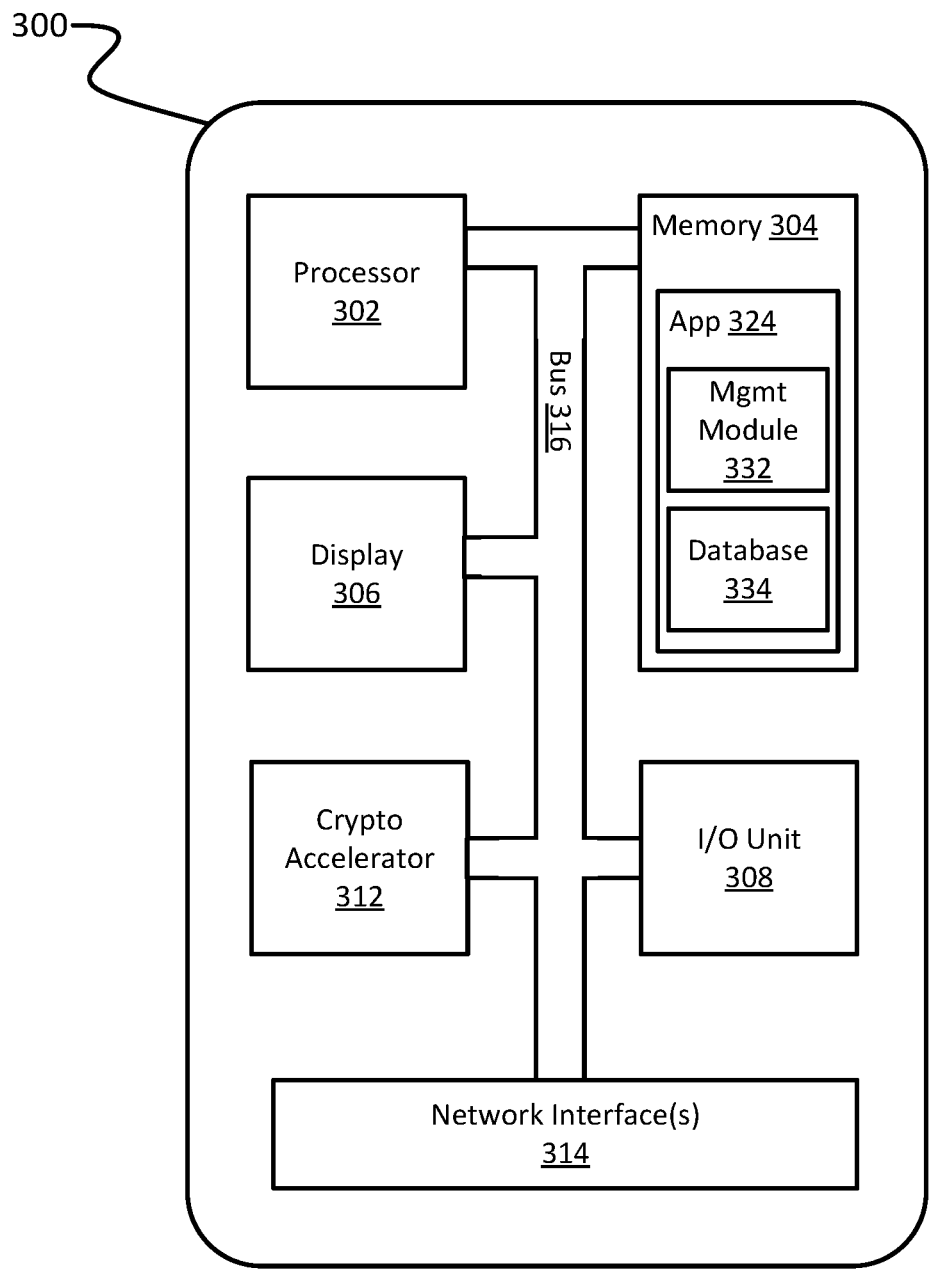
FIG. 3 shows an example of a computing device in accordance with one or more aspects of the disclosure.

To make use of the secure communication platform described above, users may download and install the secure collaboration application on their client device. FIG. 3 illustrates an exemplary client device 300 that may access the security platform 220 via a secure collaboration application. In this regard, client device 300 includes a processor 302, a memory 304, a display 306, an I/O unit 308, a cryptographic ("crypto") accelerator 312, and a network interface 314 all interconnected by bus 316.

Processor 302 may be any processor capable of interacting with the components of client device 300. For example, processor 302 may include a processor, multiprocessors, multicore processor, a dedicated controller, such as an ARM processor, an ASIC, or an FPGA, or any combination thereof. According to some examples, processor 302 may be configured to initialize a secure communication session with at least one second device, perform a two-way handshake with the at least one second device to establish a transmission key and a receiving key for the secure communication session, and encrypt first communication data using the transmission key. Processor 302 may also decrypt encrypted second communication data received from the at least one second device using the receiving key and validate a token prior to performing the two-way handshake. In other examples, processor 302 may be configured to perform a second two-way handshake with at least one other device when a participant joins and/or leaves the secure communication session. Processor 302 may also be configured to perform a two-way handshake with the at least one second device to establish a transmission key and a receiving key for the secure communication session and encrypt first communication data using the transmission key.

Memory 304 may store information accessible by processor 302, including instructions and data that may be executed or otherwise used by the processor 302 and/or crypto accelerator 312. For example, memory 204 may store instructions, such as application 324. In preferred examples, application 324 may be a secure collaboration application that provides users with the ability to participate in voice and video calls, share encrypted content, exchange encrypted communications, and share application data. Encrypted communications may include direct communications (e.g., one-to-one communications between a sender and receiver), group chats, or secure chat room communications. Data stored by memory 204 may include management module 332 and database 334. In the context of streaming data—such as during voice or video calls and application sharing, management module 332 may be configured to register streams of data with the server. In this regard, management module 332 may assign each stream a unique stream identifier and designate the stream in either an encode direction or a decode direction. Accordingly, the server receives the stream identifier and the direction designation and uses both pieces of information to subsequently route the streaming data the server receives. Database 334 may be encrypted via an encryption algorithm, such as Advanced Encryption Standard (AES), and a 256-bit key, referred to hereinafter as a local storage key. In some examples, database 334 may store information related to secure collaboration application 324. For example, database 334 may index information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication may be stored in database 334. Memory 304 may also store a plurality of ephemeral keys received from a second user that would allow the first and second user to exchange encrypted communication peer-to-peer. Accordingly, memory 304 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 304 may include short-term or temporary storage, as well as long-term or persistent storage.

Display 306 may be any electronic device capable of visually presenting information. In mobile devices, such as smart phones and tablets, display 306 may be a touchscreen display. Accordingly, display 306 may be integrated with I/O unit 308 to detect user inputs, as well as output data. In computing devices, display 306 may be an output, such as a VGA, DVI, or HDMI output, configured to connect to a monitor. In operation, display 306 may be configured to provide the decrypted communications from a second user or display an error message when receiver information is unobtainable, either from security platform 220 or locally on the sending device.

I/O unit 308 may be configured to receive input from a user and output data to the user. As noted above, the I/O unit 308 may work with touchscreen displays to receive input from a user. Alternatively, the I/O unit 308 may be an interface capable of interacting with input and output devices, such as keyboards, mice, monitors, printers, etc. In operation, I/O unit 308 may be configured to allow a user to compose a communication before the communication is encrypted and transmitted to a receiver. Additionally, I/O unit 308 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 312 may be dedicated hardware, software, firmware, or any combination thereof that is configured to perform cryptographic operations, such as key generation, random number generation, encryption/decryption, signature generation, signature verification, etc. In preferred examples, crypto accelerator 312 is a dedicated processor configured to perform cryptographic operations on behalf of processor 302. In this regard, application 324 may make use of crypto accelerator 312 to provide the secure communication functions described in greater detail below.

Figure 4:
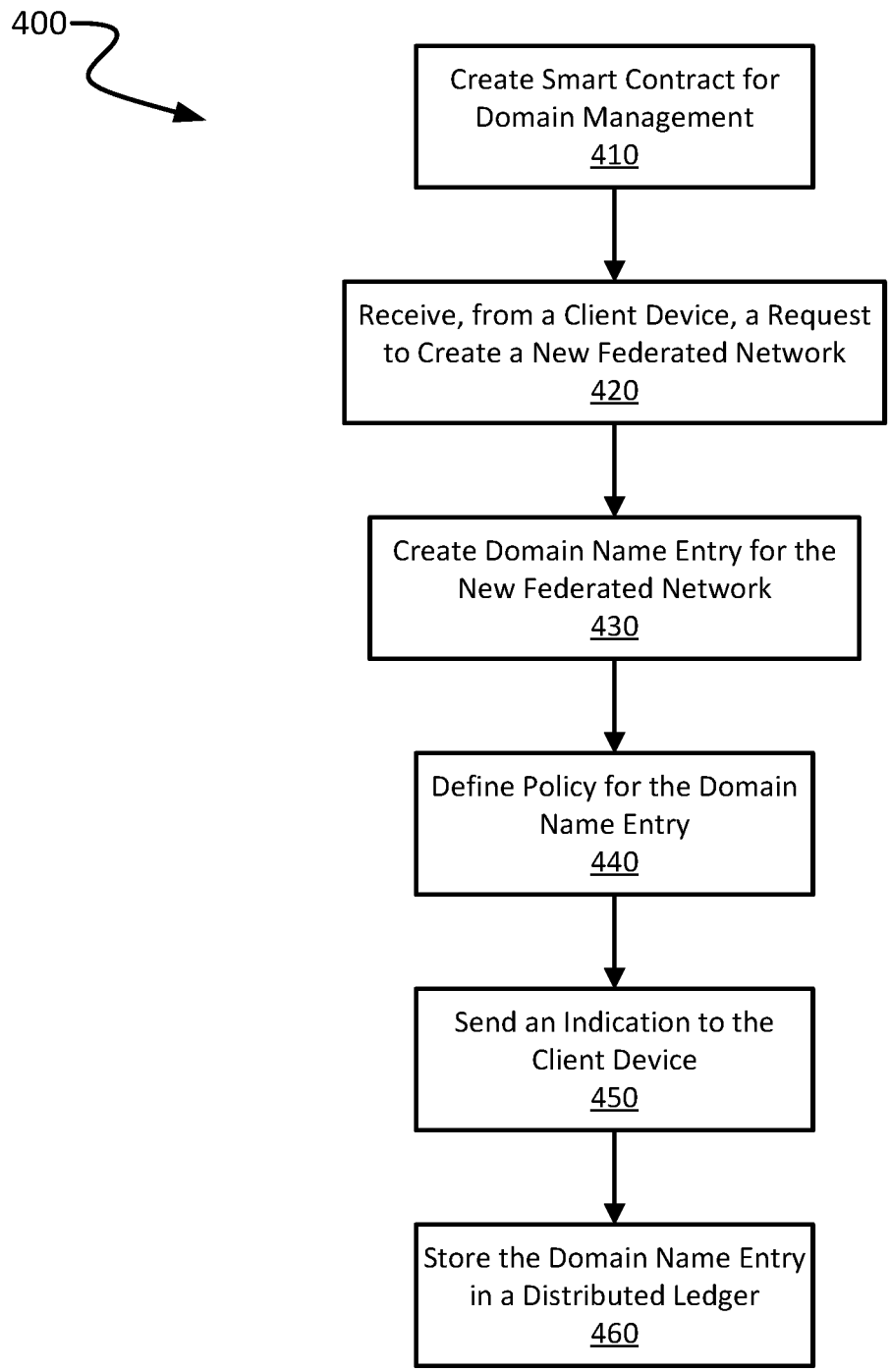
FIG. 4 shows an example of a process for creating a new federated network associated with a domain name according to one or more aspects of the disclosure.

Network interface 314 may be dedicated hardware, software, firmware, or any combination thereof that is configured to connect client device 300 to network 150. In this regard, network interface 314 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 314 may be configured to transmit encrypted first communication data to the at least one second device, receive encrypted second communication data from the at least one second device, and receive the token from the at least one second device. In other examples, interface 314 may be configured to receive an invitation to a secure communication session, transmit encrypted first communication data to at least one second device, and receive encrypted second communication data from the at least one second device As noted above, an entity (e.g., a legal person, a corporation, etc.) may wish to create a new federated network to provide users with the ability to exchange messages and/or communications securely. FIG. 4 shows a flow chart of a process 400 for creating a new federated network associated with a domain name according to one or more aspects of the disclosure. Some or all of the steps of process 400 may be performed using one or more computing devices as described herein, including, for example, root administrative server 130.

In step 410, a computing device (e.g., root administrative server 130) may create a smart contract for domain management. As noted above, the computing device (e.g., root administrative server 130) may provide entities (e.g., legal persons, corporations, etc.) with secure communication platforms associated with a domain name. As will be discussed in greater detail below, a user (e.g., an administrator) associated with the domain may request a federated network, for example, from the computing device (e.g., root administrative server 130). However, before a federated network may be established, the computing device (e.g., root administrative server 130) may define a smart contract (e.g., smart contract 140) to automatically execute, control, or document relevant events and/or actions according to the terms of a contract or an agreement. In this regard, the smart contract (e.g., smart contract 140) may define methods for registering a new federated network, creating a new domain name entry in a look-up table, updating a domain name entry in a look-up table, un-registering a federated network, etc. Further, the smart contract 140 may define the root public key, which may be used to verify signatures appended to commands and/or requests. In some instances, the smart contract 140 may define a look-up table that stores one or more domain name entries, each associated with a federated network. The computing device (e.g., root administrative server 130) may store the smart contract in a distributed ledger (e.g., blockchain).

After the smart contract has been defined, the computing device (e.g., root administrative server 130) may begin receiving requests to create new federated networks. In step 420, the computing device (e.g., root administrative server 130) may receive a request to create a new federated network from a client device. In preferred examples, an administrator, or another authorized user, may contact the computing device (e.g., root administrative server 130) to create the federated network for the entity. As noted above, the new federated network may be a communication network that supports a secure collaboration application that allows users to communicate via at least one of: messaging, group chats, voice calls, or video calls. The request to create the new federated network may comprise a domain name to associate with the new federated network, record data, a first signature, and/or a second signature. The first signature may be generated using a private key associated with the entity (e.g., private domain key). The second signature may be generated using a private key associated with the computing device (e.g., root private key). The computing device (e.g., root administrative server 130) may verify the first signature and/or the second signature before creating the new federated network and/or generating the domain name entry for the new federated network. Based on the configuration, users may be allowed to communicate with users within their own domain (e.g., federated network) or across domains (e.g., from a first federated network associated with a first entity to a second federated network associated with a second entity). The authorized user may provide a domain name with which the federated network may be associated with, for example, as part of the registration process. Usernames for the federated network and/or the secure communication platform may comprise the domain name (e.g., username@domain.com).

In step 430, the computing device (e.g., root administrative server 130) may create a domain name entry for the new federated network. As noted above, a domain name entry may comprise a domain name associated with the federated network, a network address (e.g., IP address), a public key associated with the domain, one or more settings for the domain, and the like. In some examples, the domain name entry may comprise an indication of authentication requirements for making changes (e.g., modifications, alterations, and/or updates) to the domain name entry. The smart contract (e.g., smart contract 140) may enforce the authentication requirements associated with the domain name entry. The authentication requirements may define the proof required before modifications may be made to the domain name entry. For example, the authorized user (e.g., administrator) may define that verification of a signature generated using a private domain key associated with the federated network may suffice to make changes to the domain name entry. In another example, verification of either a first signature generated using a private domain key associated with the federated network or a second signature generated using a root key associated with an administrative device (e.g., root administrative server 130) and/or the smart contract (e.g., smart contract 140) may be sufficient to modify the domain name entry. In yet another example, verification of both a first signature generated using a private domain key associated with the federated network or a second signature generated using a root key associated with an administrative device (e.g., root administrative server 130) and/or smart contract (e.g., smart contract 140) may be necessary to modify the domain name entry.

In step 440, the computing device (e.g., root administrative server 130) may define one or more policies for the domain name entry. The one or more policies may define additional authentication criteria for the federated network, the domain name, and/or the domain name entry. For example, the one or more policies may define that a range of network addresses (e.g., IP addresses) may make modifications to the federated network, the domain name, and/or the domain name entry. In another example, the one or more policies may indicate that a domain password may be required for making modifications to the federated network, the domain name, and/or the domain name entry. In yet another example, the one or more policies may require verbal confirmation before allowing the federated network, the domain name, and/or the domain name entry to be modified.

After registering the domain name, creating the federated network, and defining the policies, the computing device (e.g., root administrative server 130) may send an indication to the client device, in step 450, that the federated network has been created. In step 460, the computing device (e.g., root administrative server 130) may store the domain name entry in a look-up table stored in a distributed ledger (e.g., blockchain). By storing the look-up table in a distributed ledger, a plurality of federated networks may be able to query the look-up table to resolve network addresses of other federated networks. Moreover, storing the domain name look-up table in a distributed ledger may mitigate denial of service (DoS) attacks. That is, traditional DNS systems may be particularly vulnerable to DoS attacks because they tend to have more single points of failure. By storing the domain name look-up table in a distributed ledger, DoS attacks may be mitigated. Additionally, the domain name look-up table in a distributed ledger, the root of trust may be distributed such that there is no single point of failure. Further, the distributed ledger may be better at obscuring metadata since there is not a DNS server responding to the DNS query. From the point of view of the root administrator, the look-up table being stored in the distributed ledger may also simplify DNS lookups since no action may be required on the administrator's part. Accordingly, the DNS look-up table being stored in a distributed ledger may be significantly cheaper by necessitating less storage, bandwidth, and/or computing resources. For domain owners, access control over their domain entries may be cryptographically enforced (e.g., via signature verification), thereby providing additional safeguards over normal DNS—where the Registrar may enforce access control via a flawed authentication process. These, and additional benefits, may be realized by the domain look-up table being stored in a distributed ledger.

Figure 5:
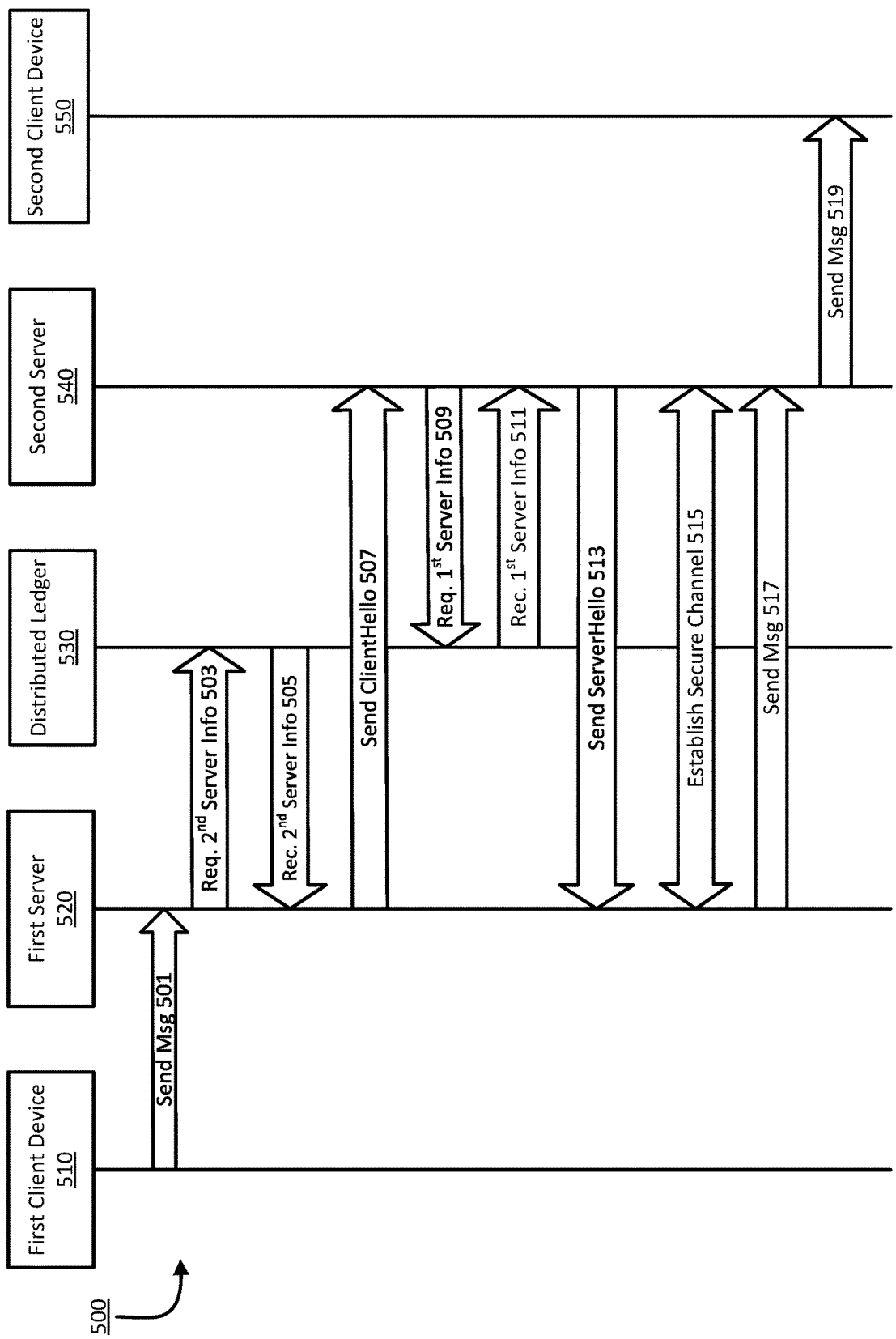
FIG. 5 shows an example of a process for sending an encrypted communication from a first federated network to a second federated network in accordance with one or more aspects of the disclosure.

Once the registration process is complete and the computing device (e.g., root administrative server 130) creates the federated network, the entity's users may begin sending and receiving encrypted messages and/or communications using the federated network. FIG. 5 shows a flow chart of a process 500 for sending an encrypted communication from a first federated network to a second federated network according to one or more aspects of the disclosure. Some or all of the steps of process 500 may be performed using one or more computing devices as described herein.

In step 501, a first client device 510 may generate an encrypted message and/or communication. First client device 510 may be any of the client devices described above with respect to FIG. 1. After generating the encrypted message and/or communication, the first user device 501 may send (e.g. transmit) the encrypted message and/or communication to first server 520. First server 520 may be similar to first communication server 112 and/or second communication server 122. That is, first server 520 may host a secure communication platform on behalf of an entity. The secure communication platform may provide the federated network to the entity and its members (e.g., first client device 510). First server 520 may receive the encrypted message and/or communication. First server 520 may review the encrypted message and/or communication to determine if the encrypted message and/or communication is for a recipient within the federated network or a recipient outside of the federated network. In this regard, the encrypted message and/or communication may comprise a domain name of the intended recipient. The domain name may be part of the intended recipient's username (e.g., username1@domain1.com). If the recipient is within the federated network, first server 520 may send (e.g., route) the encrypted message and/or communication to the recipient. However, if the intended recipient is outside the federated network, the first server 520 may perform a DNS query to determine where/how to forward the encrypted message and/or communication to its intended destination.

In step 503, the first server 520 may send (e.g., transmit) a query to a look-up table stored in distributed ledger 530. The query may comprise the domain name of the intended recipient (e.g., the second federated network). The query may resolve a network address of the domain name of the intended recipient. The public domain key may be retrieved from a domain name entry associated with the first server 520. In step 505, distributed ledger 530 may send a response to the query. First server 520 may receive the response that comprises a network address (e.g., IP address) of the domain of the intended recipient (e.g., the second federated network). The response may also comprise a public key of the domain of the intended recipient (e.g., the second federated network). In step 507, the first server 520 may send a request to establish a secure communication channel to second server 540. The request may comprise a ClientHello message associated with TLS. The second server 540 may receive the request to establish the secure communication channel.

In response to receiving the request to establish the secure communication channel, the second server 540 may send (e.g., transmit) a query to the look-up table stored in distributed ledger 530, in step 509. The query may comprise the domain name of the sender (e.g., the first federated network). The domain name may be obtained from the sender's username. The query may resolve a network address of the domain name of the sender. The public domain key may be retrieved from a domain name entry associated with second server 540. In step 511, second server 540 may receive a response to the query. The response may comprise a certificate associated with the sender's domain (e.g., first federated network). The certificate may comprise a public key associated with the sender's domain (e.g., first federated network).

In step 513, the second server 540 may send a response to first server 520. The response may comprise a ServerHello message associated with the TLS protocol. In step 515, first server 520 and second server 540 may establish a secure communication channel (e.g., TLS-encrypted communication channel). Once the secure communication channel is established, the first server 520 may send (e.g. transmit) the encrypted message and/or communication to the second server in step 517. In some instances, the first server 520, or another server supporting the secure communication platform, may send a notification to the second server 540 and/or second client device 550. The notification may be a push notification that the second client device 550 has a message and/or communication waiting. In step 519, the second server 540 may send the encrypted message and/or communication to second client device 550. Alternatively, second client device 550 may pull the encrypted message and/or communication from a server supporting the secure communication platform (e.g., first server 520, second server 540) in step 519. The second client device 550 may send encrypted messages and/or communications to first client device 510 via the secure communication channel. After a predetermined amount of time and/or inactivity, the secure communication channel between the first server 520 and the second server 540 may be torn down. A new secure communication channel may be established using the techniques above, for example, if the first federated network would like to communicate with the second federated network.

Figure 6:
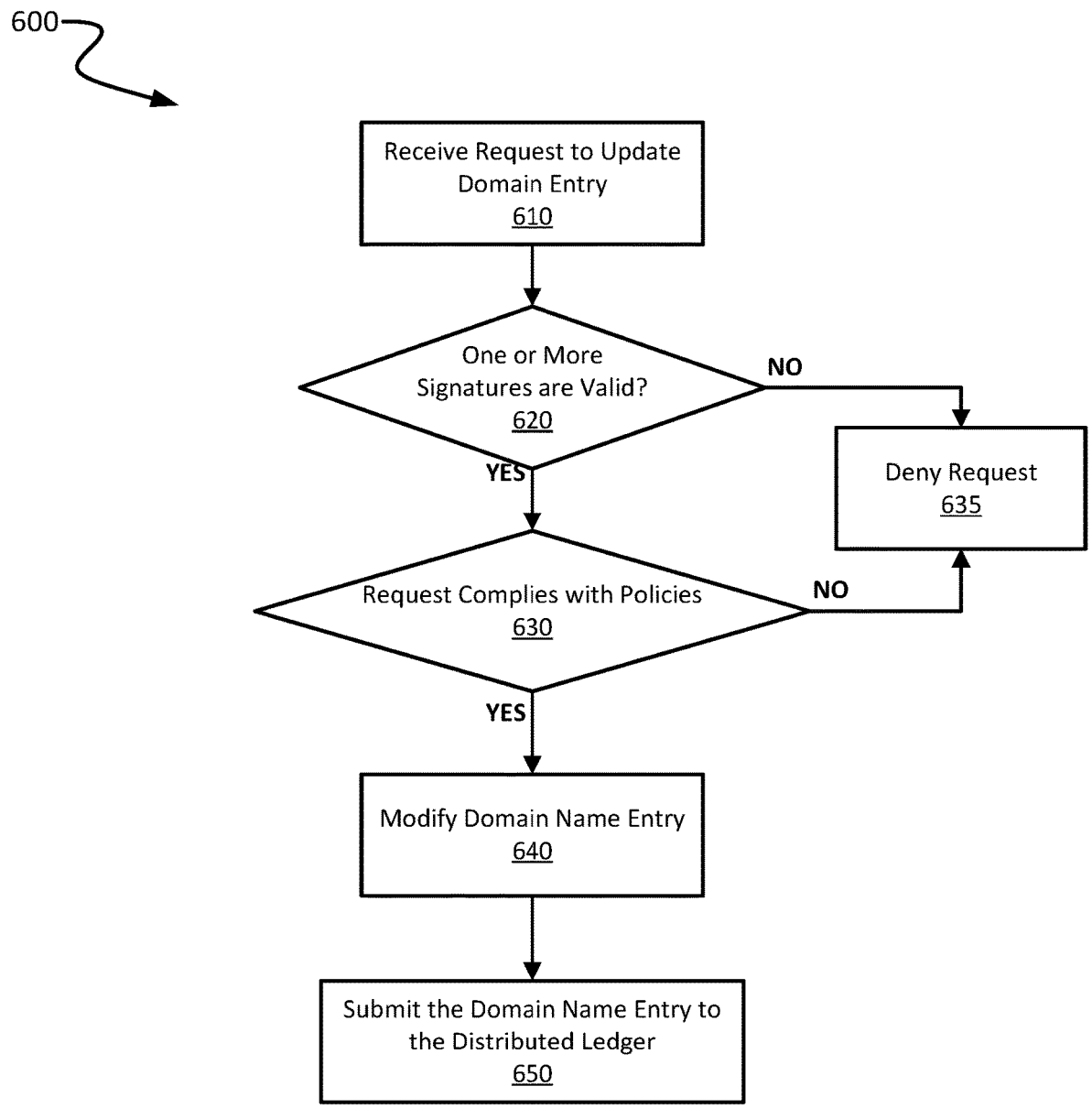
FIG. 6 shows an example of a process for modifying a domain name entry associated with a federated network in accordance with one or more aspects of the disclosure.

From time to time, a federated network may have to update their domain name entry, for example, in response to changing IP addresses or expanding its network resources. FIG. 6 shows a flow chart of a process 600 for modifying a domain name entry associated with a federated network according to one or more aspects of the disclosure. Some or all of the steps of process 600 may be performed using one or more computing devices as described herein.

In step 610, a request to modify or update a domain entry may be received. The request may be received by the smart contract (e.g., smart contract 140, discussed above), the distributed ledger (e.g., blockchain), and/or a server (e.g., root administrative server 130, also discussed above). As noted above, the request to modify a domain entry may comprise one or more signatures. The one or more signatures may be generated by a using a private domain key associated with the federated network (e.g. domain) and/or a root private key associated with a root server (e.g., root administrative server 130) of the distributed ledger.

In step 620, the request to modify the domain entry may be verified, for example, by validating the one or more signatures included in the request. For example, the one or more signatures may be verified using a public domain key associated with the federated network (e.g., domain). In some instances, the one or more signatures may be verified using a public domain key associated with the federated network (e.g., domain) or a root public key associated with the root server (e.g., root administrative server 130). In further examples, the request may comprise at least two signatures. The first signature may be verified using both a public domain key associated with the federated network (e.g., domain), and the second signature may be verified using a root public key associated with a root server (e.g., root administrative server 130). If the one or more signatures are not valid, the request is denied at step 635. However, if the one or more signatures are valid, process 600 proceeds to step 630.

In step 630, a determination may be made as to whether the request complies with one or more policies defined at the time the domain name entry was created. As noted above, the one or more policies may set further authentication criteria that should be satisfied before the domain name entry may be modified. For example, the one or more policies may define that a range of network addresses (e.g., IP addresses) may make modifications to the federated network, the domain name, and/or the domain name entry. In another example, the one or more policies may indicate that a domain password may be required for making modifications to the federated network, the domain name, and/or the domain name entry. In yet another example, the one or more policies may require verbal confirmation before allowing the federated network, the domain name, and/or the domain name entry to be modified. If the request does not comply with the additional authentication criteria, the request may be denied in step 635. If the additional authentication criteria is satisfied, then process 600 may proceed to step 640.

In step 640, the domain name entry may be modified. For example, one or more of the domain name associated with the federated network, a network address (e.g., IP address), the public key associated with the domain, and/or one or more settings for the domain may be modified, changed, altered, and/or updated. Additionally or alternatively, the domain name entry may change the network addresses permitted to make modifications to the federated network, the domain name, and/or the domain name entry. In another example, the password to modify the federated network, the domain name, and/or the domain name entry may be modified, changed, altered, and/or update. Additionally or alternatively, the verbal confirmation before allowing changes to the federated network, the domain name, and/or the domain name entry may be modified, changed, altered, and/or update.

In step 650, once the domain name entry is modified, the updated domain name entry may be submitted to the distributed ledger. In this regard, the updated domain name entry may comprise one or more signatures. The one or more signatures may be generated using a private domain key and/or a private root key. Upon successful verification of the one or more signatures, the modified domain name entry may be committed to the distributed ledger.

Figure 7:
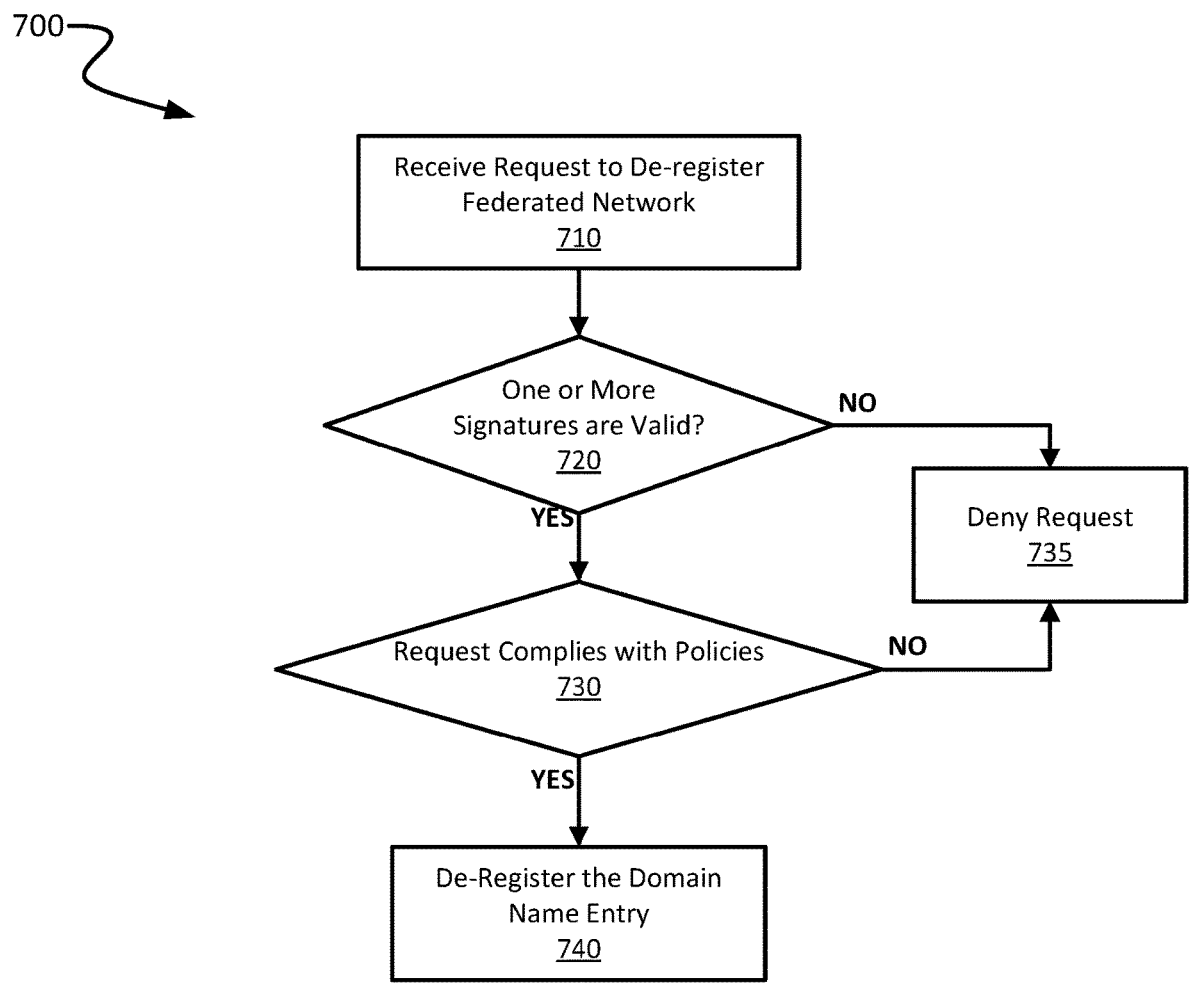
FIG. 7 shows an example of a process for de-registering a domain name entry associated with a federated network in accordance with one or more aspects of the disclosure.

Occasionally, a federated network may be shut down (e.g., terminated), and the domain name entry associated therewith may be de-registered. FIG. 7 shows a flow chart of a process 700 for de-registering a domain name entry associated with a federated network according to one or more aspects of the disclosure. Some or all of the steps of process 700 may be performed using one or more computing devices as described herein.

In step 710, a request to de-register a federated network may be received. The request may be received by the smart contract (e.g., smart contract 140, discussed above), the distributed ledger (e.g., blockchain), and/or a server (e.g., root administrative server 130, also discussed above). The request to de-register the federated network may also comprise one or more signatures. The one or more signatures may be generated by a using a private domain key associated with the federated network (e.g. domain) or a root private key associated with a root server (e.g., root administrative server 130) of the distributed ledger.

In step 720, the request to de-register the federated network may be verified, for example, by validating the one or more signatures included in the request. For example, the signature may be verified using a public domain key associated with the federated network (e.g., domain) and/or a root public key associated with the root server (e.g., root administrative server 130). If the one or more signatures are invalid, the request may be denied at step 735. When the one or more signatures are valid, process 700 proceeds to step 730.

In step 730, a determination may be made as to whether the request complies with one or more policies defined at the time the domain name entry was created. As discussed earlier, the one or more policies may set further authentication criteria that should be satisfied before the domain name entry may be modified. When the request does not comply with the additional authentication criteria, the request may be denied in step 735. However, when the additional authentication criteria is satisfied, then process 700 may proceed to step 740. In step 740, the domain name entry may be de-registered. Accordingly, if queries are subsequently received for the domain, no result may be returned. Alternatively, a response indicating that the domain has been de-registered may be returned. This may provide for better data hygiene by removing and/or eliminating records for domains (e.g., federated networks) that have been shut down, or otherwise terminated.

The above-described systems, devices, and methods may provide a distributed domain name service that mitigates against malware and/or attacks (e.g., DoS). Furthermore, the authentication techniques may provide varying levels of security that ensure the integrity and/or security of the information contained in the distributed ledger. Thus, the distributed domain name service described herein improves upon the security and/or mitigates against known attacks against existing domain name service solutions.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method comprising:
receiving, by a computing device from a user device, a request comprising a domain name to create a new federated network;
generating a domain name entry corresponding to the requested domain name for the new federated network;
defining one or more policies for updating the domain name entry;
sending, by the computing device, an indication that the new federated network has been created in association with the requested domain name;
storing the domain name entry in a distributed ledger;
generating, using a private domain key, a signature associated with a query of the distributed ledger, wherein the query obtains a network address of the new federated network; and
establishing, based on the signature and the network address obtained from the query of the distributed ledger, a secure communication channel between a first server of the new federated network and a second server associated with another federated network.

2. The method of claim 1, wherein the request to create the new federated network comprises at least one of:
a domain name;
record data;
a first signature; or
a second signature.

3. The method of claim 2, further comprising:
verifying at least one of the first signature and the second signature prior to generating the domain name entry.

4. The method of claim 1, wherein the new federated network comprises a communication network that supports a secure collaboration application that allows users to communicate via at least one of: messaging, group chats, voice calls, or video calls.

5. The method of claim 1, wherein the domain name entry comprises an indication of an authentication technique for updating the domain name entry, wherein the authentication technique is enforced by a smart contract associated with the domain name entry.

6. The method of claim 1, wherein the one or more policies comprise at least one of:
one or more network addresses that are permitted to modify the domain name entry;
a domain password for updating the domain name entry; or
requiring verbal confirmation before allowing the domain name entry to be modified.

7. The method of claim 1, further comprising:
receiving a second request to modify the domain name entry associated with the federated network;
authenticating the second request to modify the domain name entry; and
modifying the domain name entry.

8. The method of claim 7, wherein authenticating the second request to modify the domain name entry comprises:
verifying, using a public domain key associated with the federated network, a signature of the second request.

9. The method of claim 7, wherein authenticating the second request to modify the domain name entry comprises:
verifying at least one of a first signature of the second request generated using a public domain key associated with the federated network or a second signature of the second request generated using a root public key associated with an administrator.

10. The method of claim 7, wherein authenticating the second request to modify the domain name entry comprises:
verifying a first signature of the second request generated using a public domain key associated with the federated network; and
verifying a second signature of the second request generated using a root public key associated with an administrator.

11. The method of claim 1, wherein the distributed ledger comprises a blockchain.

12. A method comprising:
receiving, by a first server associated with a first federated network and from a first user device, a first encrypted communication intended for a second user device associated with a second federated network, wherein the encrypted communication comprises a domain name of the second federated network;
generating, using a private domain key, a signature associated with the domain name of the second federated network;
querying a look-up table stored in a distributed ledger, using the domain name of the second federated network, to resolve a network address of the domain name;
obtaining a response from the look-up table, wherein the response comprises a network address of the domain name;
based on the signature and the obtained network address of the domain name, establishing a secure communication channel between the first server and a second server associated with the second federated network; and
sending, from the second server to the first server via the secure communication channel, the encrypted communication.

13. The method of claim 12, wherein the response further comprises a public key of the second federated network.

14. The method of claim 12, wherein the network address comprises an internet protocol address.

15. The method of claim 12, wherein the secure communication channel comprises a channel secured via Transport Layer Security (TLS).

16. A method comprising:
receiving, by a second server associated with a second federated network and from a first server associated with a first federated network, a request comprising a domain name of the first federated network to establish a secure communication channel;
generating, using a private domain key, a signature associated with the domain name of the first federated network;
based on the signature, querying a look-up table stored in a distributed ledger, using the domain name of the first federated network, to obtain a network address of the first federated network and a public key retrieved from a domain name entry of the look-up table, the public key being associated with the first federated network;
responsive to obtaining the network address based on the domain name, establishing, using the public key associated with the first federated network, the secure communication channel between the first server and the second server; and
receiving, by the second server from the first server, an encrypted communication intended for a second user device associated with the second federated network.

17. The method of claim 16, further comprising:
sending the encrypted communication to the second device.

18. The method of claim 17, further comprising:
receiving, based on the querying the look-up table, a certificate, wherein the certificate comprises the public key associated with the first federated network.

19. The method of claim 16, wherein the establishing the secure communication channel between the first server and the second server further comprises using a second public key associated with the second federated network.

* * * * *